United States Patent Office 3,050,491
Patented Aug. 21, 1962

3,050,491
METHOD OF PREPARING SELF-ADHERING
ORGANOPOLYSILOXANE ELASTOMERS
Siegfried Nitzsche and Manfred Wick, Burghausen, Bavaria, Germany, assignors to Wacker-Chemie G.m.b.H., Bavaria, Germany
No Drawing. Filed Feb. 18, 1960, Ser. No. 9,423
Claims priority, application Great Britain Feb. 20, 1959
5 Claims. (Cl. 260—37)

This invention relates to novel silicone rubber stocks which vulcanize to form self-adhering silicone elastomers.

The widespread use of silicone rubber in the form of tapes and sheets for wrapping electrical coils and electrical conductors generally and for a host of other uses requiring tapes or sheets of the rubber has resulted in an extensive search for adhesive and self-adhering silicone rubber tapes. A silicone rubber tape which will adhere to silicone rubber, metal, plastics, wood, textiles, leather and other materials has obvious commercial value. The preparation of adherent silicone rubber tapes has heretofore employed several techniques including applying vulcanizable silicone rubber stocks to a suitable carrier or backing material such as glass cloth. Application of the stock was accomplished by rolling, brushing, immersing, calendering or other technique and the silicone rubber stock was partially vulcanized. The partial vulcanization could be accomplished by complete vulcanization of one side of the tape leaving the other side partially vulcanized and tacky. However, storage of such tapes resulted in rapid deterioration of the tacky characteristics. Furthermore, the use of glass cloth or other material as the carrier or base for the tape reduced the flexibility and stretchiness of the tape.

It was obvious to deposit a layer of tacky or sticky substance on one surface of a vulcanized silicone rubber tape and this has been tried with indifferent success. The adhesive layer does not adhere well to the vulcanized rubber and migrates during storage. Furthermore, when the tape is used, the windings of tape cannot be applied with pressure or the adheive may well be squeezed out of position thus leaving non-adherent spots in the winding.

Problems of storage, migration of adhesive, loss of adhesiveness, difficulty and expense of preparation, unsatisfactory performance and a host of other problems led to a continuation of the search for an adherent silicone rubber tape. A recent breakthrough on this problem was the discovery that a vulcanized silicone rubber containing from .015 to .5 percent by weight based on the weight of the silicone polymer present, of boron added as an alkyl borate exhibited self-adherent properties (see U.S. Patent application Serial No. 696,623, filed November 15, 1957, now abandoned).

This recent development of self-adhering silicone rubber tapes was surprising in view of the fact that it was known to condense essentially diorganosiloxane polymers with alkyl borates or with boric acids. This condensation procedure has been employed to prepare "bouncing putty" which is a fluid material exhibiting rebound elasticity but devoid of cohesion when flexed and obviously not a true elastomer. The use of boric acid, boric acid anhydrides and alkyl borates in very small amounts to improve the handling properties of silicone rubber stocks is also known (see U.S. Patent No. 2,721,857). Thus the discovery of self-adhering silicone rubber based on the addition of alkyl borates has been quite surprising.

It is the primary object of this invention to introduce a novel silicone rubber stock exhibiting self-adhesion when vulcanized in the form of tapes, sheets, and so forth. Another object is an organosiloxane polymer which can be employed in preparing rubber stocks by standard procedures with known fillers, vulcanizing agents and additives and can be vulcanized to produce a self-adhering silicone rubber. Other objects and advantages of the present invention are detailed in or will be apparent from the disclosure and claims following.

This invention consists essentially of preparing diorganosiloxane polymers suitable for use in self-adhering silicone rubber stocks by polymerizing low molecular weight essentially diorganosiloxane polymers in the presence of 0.001 to 0.1 percent by weight of boric acid or alkyl ester of boric acid.

The low molecular weight diorganosiloxanes employed as starting materials herein are cyclic diorganosiloxanes such as octamethylcyclotetrasiloxane and linear diorganosiloxane polymers endblocked with hydroxyl radicals and having a viscosity between 5 cs. and 100,000 cs. at 25° C., preferably those polymers having a viscosity between 200 cs. and 1,000 cs. at 25° C. The organic substituents in such polymers are monovalent hydrocarbon radicals and halogenated monovalent hydrocarbon radicals including any alkyl radical such as methyl, butyl and octadecyl; any aryl radical such as phenyl and anthracyl; any alkenyl radical such as vinyl, allyl and octadecenyl; any alkaryl radical such as tolyl and xylyl; any aralkyl radical such as benzyl and phenylethyl; or any cycloaliphatic radical such as cyclopropyl, cyclobutyl and cyclopentyl; or any halogenated derivative of the foregoing radicals, such as haloalkyl including chloromethyl, perfluoroethyl and 3,3,3-trifluoropropyl; haloaryl such as chlorophenyl and iodoanthracyl; haloalkenyl such as chlorodifluorovinyl and bromoallyl; haloalkaryl such as $\alpha,\alpha,\alpha$-trifluorotolyl; haloaralkyl such as bromobenzyl; and halocycloaliphatic such as chlorocyclopropyl. Preferably at least 50 percent of the organic substituents are alkyl radicals of less than 5 carbon atoms.

It is apparent the operative siloxanes are polymers of the unit formula

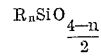

$$R_nSiO_{\frac{4-n}{2}}$$

where each R is a monovalent hydrocarbon or monovalent halohydrocarbon radical as described above and $n$ has an average value of 1.99 to 2.01 and such polymers include cyclic siloxanes such as $(R_2SiO)_x$ where $x$ is 3 to 8 or more as well as linear polymers having hydroxyl groups as endblockers such as $HOR_2SiO(R_2SiO)_ySiR_2OH$ where $y$ is an integer not exceeding about 1,000. Limited amounts of $RSiO_{3/2}$ units and $R_3SiO_{1/2}$ units can be tolerated but the presence of more than 0.1 mol percent of such units is deleterious to the ultimate rubber. In the polymeric units, each R can be the same as the others such as in dimethylsiloxane units or the R's can be different such as in phenylmethylsiloxane. Homopolymers, copolymers and mixtures of polymers can be employed.

The low molecular weight diorganosiloxane polymer is further polymerized to form the gum-like high polymers employed in silicone rubber production. The polymerization catalysts employed are known in the art. Thus when cyclic polymers are employed it is preferred to use alkali metal compounds such as sodium siliconates, hydroxides of sodium, potassium or cesium or other known alkali metal compound as the polymerization catalyst. An interesting adaptation of the alkali metal compound catalyst and boron compound additive as taught herein involves the use of alkali metal borate such as potassium meta borate to supply the alkali polymerization catalyst and boron compounds at the same time.

The polymerization of linear hydroxyl endblocked diorganosiloxanes is very well known. The preferred catalysts for this polymerization are phosphorous-nitrogen compounds as disclosed in United States Patent No. 2,830,967 issued April 15, 1958. The operative phosphorous-nitrogen compounds are selected from $(PNCl_2)_n$ where $n$ is an integer exceeding 2, $RR'NPX_2$, $RR'P=NR''$, $$RR'N\overset{O}{\underset{\|}{P}}X_2 \text{ and } RR'N\overset{O}{\underset{\|}{P}}=NR''$$

where each R and each R' are hydrogen atoms or radicals selected from alkyl, aryl, aralkyl and alkaryl, at least one of R and R' being organic, each R'' is a radical selected from aryl, alkyl, aralkyl and alkaryl and each X is a halogen atom. The phosphorous-nitrogen compound is added to a linear, essentially diorganosiloxane polymer of relatively low molecular weight and the boron compound is added at the same time. The mixture can be heated and stirred to accelerate the polymerization and a high molecular weight polymer is obtained.

The operable boron compounds are boric acid and alkyl borates in addition to the alkali metal borate noted above. The boron compounds are employed in very small proportions hence addition of the boron compound in the form of a paste in diorganosiloxane fluid is useful. The quantities of boric acid or alkyl borate employed range from .001 percent to .1 percent by weight based on the weight of diorganosiloxane polymer present. Larger quantities of boron compound impede the vulcanization and depress the physical properties of the ultimate rubber. When less than .001 percent by weight of boron compound is employed, the desired self-adhesion is not realized in the ultimate rubber.

The use of boric acid or alkyl esters of boric acid as the sole catalyst for the polymerization of the siloxanes does not produce the desired self-adhering silicone rubber. It is only when standard polymerization techniques are employed in the presence of the stated proportions of boric acid or alkyl borate that the silicone rubber produced from the polymer will be self-adhering.

The polymers prepared in accordance with this invention can be handled in standard fashion for preparation of silicone rubber stocks and vulcanization thereof to produce silicone rubber. Fillers such as diatomaceous earth, carbon blacks, fume silica, silica aerogel and xerogel, quartz flour, glass fibers and frit, mica flour, titanium dioxide, zinc oxide, clays and a host of known silicone rubber fillers can be added in quantities of 20 to 200 parts filler per 100 parts polymer. Other additives such as pigments, compression-set additives, plasticizers, heat stabilizers, and so forth can be added in normally employed quantities generally not exceeding about 5 parts of each additive per 100 parts polymer.

Any desired vulcanization system can be employed. The widely employed organic peroxide-heat vulcanization system is perhaps best known. Small quantities, i.e. 0.1 to 10 parts per 100 parts polymer, of organic peroxides are added to the silicone rubber stock and thoroughly dispersed therein. The silicone rubber stock is then heated to activate the peroxide and bring about the desired vulcanization. Operative peroxides include benzoyl peroxide, chlorobenzoyl peroxide, dichlorobenzoyl peroxide, di-t-butyl peroxide, dicumyl peroxide, t-butyl perbenzoate, t-butyl peracetate, isopropylbenzene hydroperoxide, benzoyl acetyl peroxide and other peroxides as disclosed in U.S. Patent No. 2,460,795.

Alternatively, the silicone rubber stocks can be vulcanized by exposure to high energy ionizing radiation such as emitted by particle accelerators such as the Van de Graaff accelerator, hard X-rays, Co-60, and other similar radiation sources.

Still another vulcanization system available requires the addition to each 100 parts of siloxane polymer in the silicone rubber stock of .05 to 10 parts by weight of a cross linking agent such as a methylhydrogensiloxane, an alkyl silicate or an alkyl polysilicate and .01 to 5 parts by weight of a curing catalyst such as a metal salt of a carboxylic acid such as dibutyl tin dilaurate, stannous octoate, lead octoate, zinc naphthenate, iron naphthenate and other well-known metal salts. This system is disclosed in co-pending application Serial No. 602,081, filed August 3, 1956. This system permits vulcanization at room temperature and is attractive for many applications of the material claimed herein.

Tapes, sheets, tubes and other forms of the silicone rubber prepared by the method of this invention have a wide variety of known uses. Perhaps the best known use is as electrical insulation for coils and other conductors. The silicone rubber stocks of this invention can be used for vibration damping, sealing, gasketing, calking, coating, potting, moldings and a host of other uses. Furthermore, excellent adhesion between standard organosiloxane rubber formulations and metal is achieved with the silicone rubber stocks of this invention as bonding agents. For example, metal can be primed with an alkyl polysilicate such as ethyl polysilicate which is permitted to air dry to eliminate any solvents employed. A thin layer of silicone rubber stock prepared in accordance with this invention is next applied to the primed surface and finally the outer layer of silicone rubber can be applied. The assembly is heated to vulcanize the rubber and an excellent bond of superior mechanical stability is achieved. This method does not require pressure to secure the desired adhesion and the bonding layer of rubber exhibits physical properties such as heat stability, compression-set and so forth equivalent to that achieved with standard silicone rubber stocks.

Another unique use for the silicone rubber stocks of this invention involves repair of damage to vulcanized silicone rubber materials. Separate pieces of vulcanized silicone rubber can be bonded together by applying thereto a coating or layer of the silicone rubber stock of this invention and vulcanizing the silicone rubber stock under light pressure. Similarly, cuts, abrasions and other damages in silicone rubber pieces such as in silicone rubber insulation on wire can be filled with the silicone rubber stocks of this invention. The added rubber stock can be vulcanized by heating under light pressure of the room temperature vulcanizing system can be employed thus avoiding the need for pressure or heating.

The adhesion of silicone rubber stocks of this invention suggests their use as linings for dental plates and especially those of acrylate resins. The use of these stocks in other prosthetic appliances is also suggested.

The following examples are included to aid in understanding and practicing this invention. The scope of the invention is delineated in the claims and is not limited by the examples. All parts and percentages in the examples are based on weight and all viscosities were measured at 25° C. unless otherwise specified.

*Example 1*

10 mg. of boric acid in the form of a saturated aqueous solution were added to 100 g. of hydroxyl endblocked dimethylsiloxane polymer of 600 cs. viscosity and 0.1 g. of trimeric phosphoronitrile chloride dissolved in 1 cc. of methylene chloride was added. The mixture was heated to 120° C. with stirring and further polymerization of the dimethylsiloxane occurred. The mixture was cooled and a gumlike lightly tacky dimethylsiloxane polymer of greater than 10,000,000 cs. viscosity was obtained.

A mixture of 50 g. of the gum obtained above, 20 g. fume silica and 1 g. 2,4-dichlorobenzoyl peroxide was prepared on a roll mill. The silicone rubber stock so prepared was extruded to form a tape 10 mm. wide and 0.2 mm. thick. The tape was vulcanized by heating at 250° C. for 5 seconds. A copper conductor was wound with the tape under light elongation to permit easy overlap of the tape. A unitary insulating layer firmly bonded to the copper and the laps of tape bonding to each other was obtained. The conductor was heated to 200° C. for 200 hours without deleterious effect to the insulation per se or to the bonding of the insulation to the copper conductor.

*Example 2*

100 g. of pure octamethylcyclotetrasiloxane was heated with steady stirring to 150° C. and 10 mg. of potassium metaborate in the form of a saturated aqueous solution was added. The mixture was heated for 5 hours at 170° C. and a benzene soluble dimethylsiloxane gum was obtained.

A mixture of 50 g. of the dimethylsiloxane gum so obtained, 50 g. calcined diatomaceous earth and 1.5 g. benzoyl peroxide was prepared on a three roll mill. A sheet of rubber stock 1 mm. thick was prepared from this mixture and was placed between two layers of vulcanized commercial silicone rubber. This assembly was heated at 110° C. for five minutes under a pressure of 1.5 kg. per sq. cm. A unitary, homogeneous silicone rubber sheet resulted.

*Example 3*

A mixture was prepared by agitating 100 g. of a copolymer of 99.8 mol percent dimethylsiloxane units and 0.2 mol percent methylvinylsiloxane units having a viscosity of 350 cs. while adding 25 mg. triethylborate. The mixture was heated to 110° C. and 1 mg. of $FeCl_3 \cdot 6H_2O$ was added. A high viscosity oil of about 74,000 cs. viscosity was obtained. 100 g. of this oil and 100 g. mica flour together with 0.5 g. tetraethyl silicate and 0.5 g. dibutyl tin dilaurate were thoroughly admixed. Alkali-free glass cloth was coated with the mixture and an insulated tape exhibiting self-adhesion was obtained within one-half hour at room temperature. The tape retained its self-adhering properties even after ½ year storage at room temperature.

*Example 4*

A silicone rubber stock consisting of 100 parts of a dimethylsiloxane gum, 50 parts of fume silica, and 2 parts benzoyl peroxide were employed to cover a copper electrical conductor. The silicone rubber stock was vulcanized by heating under pressure in the manner common to the art. The insulating characteristics of the silicone rubber coating on the copper conductor were tested and a section of the coating 5 cm. in length was found to have poor dielectric strength. The defective portion of silicone rubber was cut from the copper conductor and the cut surface was cleaned with acetone. Then the exposed section of copper conductor was coated by hand with the mixture of Example 1. The section so coated was heated at 120° C. for 10 minutes in a hand vulcanizing press. The added silicone rubber mass combined with the cable completely, homogeneously and faultlessly.

*Example 5*

When a silicone rubber was prepared in accordance with Example 1 employing a copolymer of 5 mol percent phenylmethylsiloxane and 95 mol percent dimethylsiloxane, a copolymer of 50 mol percent dimethylsiloxane and 50 mol percent ethylphenylsiloxane, or a copolymer of 50 mol percent 3,3,3-trifluoropropylmethylsiloxane and 50 mol percent dimethylsiloxane, the rubber obtained was self-adhering and adherent to copper and aluminum.

*Example 6*

When Example 2 was repeated employing a sodium siliconate as the polymerization catalyst and trimethyl borate as the boron additive, equivalent results were achieved.

That which is claimed is:

1. A method of preparing self-adhering silicone rubber consisting essentially of (A) admixing (1) a high polymer diorganosiloxane prepared by polymerizing a low molecular weight diorganosiloxane of the unit formula $$R_nSiO_{\frac{4-n}{2}}$$

wherein each R is a monovalent radical selected from the group consisting of hydrocarbon and halohydrocarbon radicals and $n$ has an average value of 1.99 to 2.01 in the presence of .001 to 0.1 percent by weight based on the weight of the diorganosiloxane of a boron compound selected from the group consisting of boric acid and alkyl esters of boric acid, (2) a filler and (3) a vulcanizing agent and (B) vulcanizing the mixture.

2. The method of claim 1 wherein the filler is a silica, the vulcanizing agent is a diorganoperoxide and the mass is heated to activate the peroxide thereby effecting vulcanization.

3. The method of claim 1 wherein the high polymer diorganosiloxane is a dimethylsiloxane gum, the filler is a silica, the vulcanizing agent is selected from the group consisting of benzoyl peroxide, dichlorobenzoyl peroxide, tertiary butyl perbenzoate, di-tertiary-butyl peroxide and dicumyl peroxide, and the mixture is heated to activate the vulcanizing agent and effect a cure.

4. The method of claim 1 wherein the filler is a silica and the vulcanizing agent is a mixture of cross-linking agents selected from the group consisting of methyl hydrogensiloxanes, alkyl silicates and alkyl polysilicates and a metallic salt of a monocarboxylic acid wherein the metallic ion is selected from the group consisting of tin, lead, zinc and iron, and the mass is vulcanized at room temperature.

5. The method of preparing high polymer diorganosiloxanes suitable for use in self-adhering silicone rubber consisting essentially of polymerizing low molecular weight diorganosiloxane polymers consisting essentially of units of the formula $$R_nSiO_{\frac{4-n}{2}}$$

where each R is a monovalent radical selected from the group consisting of hydrocarbon and halohydrocarbon radicals and $n$ has an average value of 1.99 to 2.01 by contacting the low molecular weight polymer with .001 to 0.1 percent by weight based on the weight of the diorganosiloxane polymer of potassium meta borate.

References Cited in the file of this patent

UNITED STATES PATENTS

| | | |
|---|---|---|
| 2,490,357 | Hyde | Dec. 6, 1949 |
| 2,541,851 | Wright | Feb. 13, 1951 |
| 2,721,857 | Dickman | Oct. 25, 1955 |
| 2,793,222 | Kantor et al. | May 21, 1957 |
| 2,843,555 | Berridge | July 15, 1958 |
| 2,927,907 | Polmanteer | Mar. 8, 1960 |
| 2,983,697 | Brown et al. | May 9, 1961 |